(12) United States Patent
Vimpari

(10) Patent No.: US 6,980,556 B2
(45) Date of Patent: Dec. 27, 2005

(54) METHOD FOR SPLITTING PROXY FUNCTION WITH A CLIENT TERMINAL, A SERVER AND A TERMINAL USING THE METHOD

(75) Inventor: Markku Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/816,382

(22) Filed: Apr. 1, 2004

(65) Prior Publication Data

US 2005/0226254 A1  Oct. 13, 2005

(51) Int. Cl.[7] .......................... H04L 12/28; H04L 12/56
(52) U.S. Cl. ................. 370/395.52; 370/230; 370/235; 370/401; 709/223; 709/224; 709/231; 709/238
(58) Field of Search ............................... 370/351–356, 370/395.52, 230, 235, 401; 709/223, 224, 709/231, 238, 239, 246

(56) References Cited

U.S. PATENT DOCUMENTS

| 2002/0103898 A1* | 8/2002 | Moyer et al. ................ 709/224 |
| 2002/0150092 A1* | 10/2002 | Bontempi et al. .......... 370/389 |
| 2003/0177384 A1* | 9/2003 | Jones et al. ................. 713/201 |

* cited by examiner

Primary Examiner—Wellington Chin
Assistant Examiner—Raj Jain
(74) Attorney, Agent, or Firm—Harrington & Smith, LLP

(57) ABSTRACT

The invention relates to a method of a network arrangement for establishing a data transfer connection between a workstation equipped with a SIP application, but residing in a first network not supporting SIP protocol, and a second workstation or terminal, advantageously a mobile terminal, residing in a network supporting SIP protocol. A connection is established by creating a TCP tunnel from a SPWM agent in the first network to a SPWM connection point in the second network. The invention relates also to a computer program implementing the SPWM agent and SPWM connection point.

26 Claims, 3 Drawing Sheets

METHOD FOR SPLITTING PROXY FUNCTION WITH A CLIENT TERMINAL, A SERVER AND A TERMINAL USING THE METHOD

FIELD OF THE INVENTION

The invention relates to a method for splitting a proxy function in a SIP (Session Initiation Protocol) based telecommunication connection. The invention also relates to a communication network arrangement using the method, a terminal device and a server used in the communication network and software applications saved in the terminal device and a server, which implements the method.

BACKGROUND OF THE INVENTION

Today, more and more conventional telephone calls are transmitted via networks that were originally intended for data transfer. This provides a possibility of using packet-switched data transfer connections in which the cost of data communications is reasonably low also for voice calls. One example of such data communication networks is the Internet. In the Internet the connection information is generally defined or presented in some other way than a conventional telephone number. One possibility is to use IP addresses (Internet Protocol) throughout the connection establishment. Nowadays the most commonly used address protocol is IPv4 (Internet Protocol version 4), which unfortunately has a limited address space. That is why it will in the future be substituted by a version IPv6 (Internet Protocol version 6), which has a wider address space.

Typically dynamic IP addresses are used on the terminals. In the (W)LAN (Wireless Local Area Network) environment a protocol called DHCP (Dynamic Host Configuration Protocol) is used to assign addresses to clients when they are connected to the network. In cellular packet networks the IP addresses are typically assigned by lower layer (below IP level) protocols. Also in cellular packet networks the IP address given to the terminals is typically dynamic, and thus varies every time when a terminal is connected to the packet network. There exist prior-art techniques e.g. Mobile IP, which can provide static higher level IP addresses to the terminals even when the IP address seen by the access network is dynamic. With IPv6 there is possible to use static addresses inside the same network, but when the terminal is moved to another network e.g. home LAN instead of corporate LAN (as 131 versus 141 on FIG. 1 discussed later) the address has to be different to make IP level packet routing possible.

Another possible way of establishing a telecommunication connection in these data networks is to use SIP. The Session Initiation Protocol has been standardized by IETF (Internet Engineering Task Force), and its standard number is RFC 3261. The recipient's or user's address according to SIP is of the form: sip:user@network, i.e. it resembles the form of e-mail addresses. SIP is a control protocol which is used to tell to the other peer what actual IP address is used by the user at that particular time. SIP also provides address independency in different networks because the user URL (Uniform Resource Locator) is used as address instead of IP address.

It is expected that SIP based applications will emerge in the near future. Unfortunately SIP is not designed to work over Network Address Translator (NAT), which is currently needed to connect Intranets with local IP address range to the public Internet. This will limit the possibility to launch generic peer-to-peer applications using SIP protocol.

The main reason for using NATs in the Internet is the limited address space of the IPv4 protocol. For saving available IP addresses it is common to share an IP address or addresses in Intranet solutions. So inside a certain Intranet every terminal has its own local address, but towards the Internet several or all users have a common IP address. In the long run the emerging IPv6 will remove the need for address translations, but even then firewalls will be needed for security reasons. In the firewalls there is typically only part of the UDP (User Datagram Protocol) or TCP (Transmission Control Protocol) ports allowed, and for UDP ports the virtual connection i.e. the pinhole for UDP packets is based on an inactivity timer. The timer will release the connection after few tens of seconds of inactivity, e.g. a silent moment.

FIG. 1 depicts an example of the current situation. In the example of FIG. 1 hubs, switches or NATs 143 and NATs 113, 123a, 123b, 133 are used to discriminate local Intranets from the rest of a communication network 100. By that way is accomplished a sub-network differentiated from the Internet 111 by said NATs, which often are included in a hub, switch or router as a software application. NATs and firewalls are designed to work correctly with the most popular applications including for example web browser and email clients. These clients utilize TCP connection from the client to server. Because the TCP connection is stateful and established always from the client to the server direction, there is no need to apply inactivity timer.

In FIG. 1 is depicted an example of a multi-level communication network 100. It comprises several sub-networks 121, 122, 131, 141, 151 and 161. One of them is a home LAN with a reference sign 141. Several wireless 145 or conventional PCs (Personal Computers) can be connected to the home LAN 141. The home LAN 141 is connected via a cable or XDSL (Digital Subscriber Line) modem 146 to one Internet service provider's (ISP) Intranet 121. It is also possible that a computer 125 is connected directly via an XDSL or PSTN (Public Switched Telephone Network) modem 124 to some ISP Intranet 122.

In a corporate environment a corporate Intranet 131 is a usual way to handle computer communication inside the corporation. Said Intranet 131 is differentiated from the Internet 111 by a router 133 including a NAT and firewall. The corporate Intranet 131 can comprise of numberless PCs 135. So all above-mentioned ISP Intranets 121, 122 and corporate Intranets 131 are connected to the Internet 111 via routers 123a, 123b and 133, which usually have their own firewall and NAT.

It is clear from above that it is not easy to use SIP protocol in the Internet environment, which includes numerous NATs and firewalls. The reason for that is that the IP addresses negotiated with SIP are not from the same address space, exactly the same Intranet address is used in various Intranets and thus from other Intranet it is not possible to route packets to another Intranet.

Nowadays cellular terminals 165 can be connected 164 also to cellular networks 161 which utilize packet switching technology. Some examples of these networks 161 are GPRS (General Packet Radio Service), 3G (3 Generation) and 2.5 CDMA (Code Division Multiple Access) networks. In these networks 161 it is possible to transport information, pure data or voice, basically in the same way as in the Internet 111. That makes it possible to change information between a cellular terminal 165 located in a GPRS network 161 and a PC terminal 125, 135 or 145 connected to some Intranet or home LAN. This connection requires that the transferred information coming from for example GPRS network 161 goes via cellular service provider's Intranet 151. The operator Intranet is separated by a router 163 from the cellular network 161 and by a router or NAT 113 from the Internet 111. The router 113 between the operator Intranet 151 and the Internet 111 very often comprises a NAT and a firewall.

Inside the cellular system 161, GPRS or 3G, SIP protocol can be utilized without problems. There are no network elements which need some kind of address translation. So the operator Intranet 151 and cellular network 161 are connected in a way that allows utilizing local IP addresses negotiated with SIP in the operator network as a whole. The operator Intranet 151 advantageously includes a server 159, which functions as a SIP proxy/registrar controlling communication using SIP addresses inside the operator network. In practice, server 159 contains a lot of separate servers e.g. separate SIP proxies and registrar, or in IMS network (IP Multimedia Subsystem) also various other servers. For simplicity, in this example the server 159 is assumed to contain all required functionalities.

The address conversion problem described above arises if it is needed to establish a connection using SIP protocol from a cellular terminal 165 for example to a home PC connected to the Internet 111 for example via a couple of Intranets 141 and 121. Various solutions to this problem are proposed, which solutions unfortunately all have their own limitations. Some typical problems are that they need enhancements to the NAT or firewall boxes 113, 123 and 133 of the Internet service provider, a special server e.g. STUN (Simple Traversal of UDP through NATs) or TURN (Traversal Using Relay NAT) to be located on the Internet and/or that they need additional functionality on the SIP enabled clients or that they do not work properly if the media stream is not constant, i.e. they do not keep the UDP binding on the NAT or firewall alive.

It is also known to connect Intranets together using Virtual Private Network (VPN) technology. Technically thinking VPN connection from the workstation or from the Intranet (VPN router) to the service provider's Intranet solves the problem. But at the same time this solution generates some new ones:

Costs: For wide scale consumer usage e.g. hundred of thousand or millions of individual subscribers with their own VPN from a home PC instead of few VPN corporate routers require huge customer support effort.

Security: Having a VPN connection into the service provider's Intranet is a clear security risk.

Usability: In the remote client side the end user needs to have a VPN connection and a direct connection to the Intranet active at the same time. This yields to a challenging port level configuration of the VPN system, because for every application and media of the application the VPN tunnelling policy needs to be configured separately, i.e. a certain UDP or TCP port is routed to the VPN tunnel or to the public Internet. This is due to the fact that the VPN has no information about what ports are sued for SIP enabled applications and what are used by other applications.

Applications utilizing TCP connection to bypass firewalls or NATs are also known, e.g. Real player, but they do that only for their own use, not provide access to generic SIP enabled application.

SUMMARY OF THE INVENTION

An object of the invention is to provide a new, cost effective and secure peer-to-peer connection establishment procedure for clients capable of using SIP protocol in a communication network arrangement, which comprises a sub-network utilizing SIP protocol and at least another sub-network not capable of utilizing SIP protocol, like the Internet or ISP or corporate Intranet, whereto the client is connected.

The objects of the invention are achieved by a method and a network arrangement, which is similar to existing main stream TCP applications from the NAT or firewall point of view. This is achieved by splitting needed proxy functions in connection with SIP protocol between the operator Intranet and the remote client. This way a TCP tunnel can be established from the client directly to the operator Intranet. Thus the address translation problems related to SIP protocol in NATs and firewalls can be avoided. An advantage of the invention is that it is possible to get SIP applications working from a home LAN, an Intranet or the Internet in a transparent way through any NAT or firewall elements.

Another advantage of the invention is that it is not needed to modify the home or Intranet NAT, router or firewall configuration; only the TCP listening port in the operator NAT or firewall needs access from the Internet like e.g. an email or web server. So there is no need either to modify the SIP proxy or IMS (IP Multimedia Subsystem) service platform or application servers on the operator Intranet.

A further advantage of the invention is that it increases the capacity of the NAT compared to the prior-art solutions because it packs SIP and multiple medias on one and the same connection seen by the NAT.

A further advantage of the invention is that it provides an easy way to arrange a secure tunnel. User specific ciphering can be applied to data on the tunnel according to the invention. A pseudo random ciphering key can advantageously be inherited e.g. from the authorization headers of the SIP registration dialog negotiated by a client application and the SIP proxy. This way a need to configure VPN tunnel security keys separately is avoided.

Yet another advantage of the invention is that it provides additional security to the home or corporate network compared to the prior-art solutions. There are not any open listening sockets in the configuration according to the invention.

The idea of the invention is basically as follows: Proxy functions in a cellular operator Intranet (or in the Internet) are split according to the invention with a client and operator Intranet elements. A client part of the invention is working in the client side and the operator part of the invention is working behind a NAT and firewall elements of the operator Intranet. This configuration is called here SPWM (Split Proxy With Media). The SPWM configuration according to the invention has a VPN-alike tunnel between the client and advantageously operator NAT or firewall. The tunnel uses single TCP connection to bypass all NATs or firewall elements on the route from the client part to the operator part like HTTP browser or email client.

BRIEF DESCRIPTION OF THE DRAWINGS

The invention is described in detail below. Reference is made to the accompanying drawings in which.

DETAILED DESCRIPTION

Figure 1:
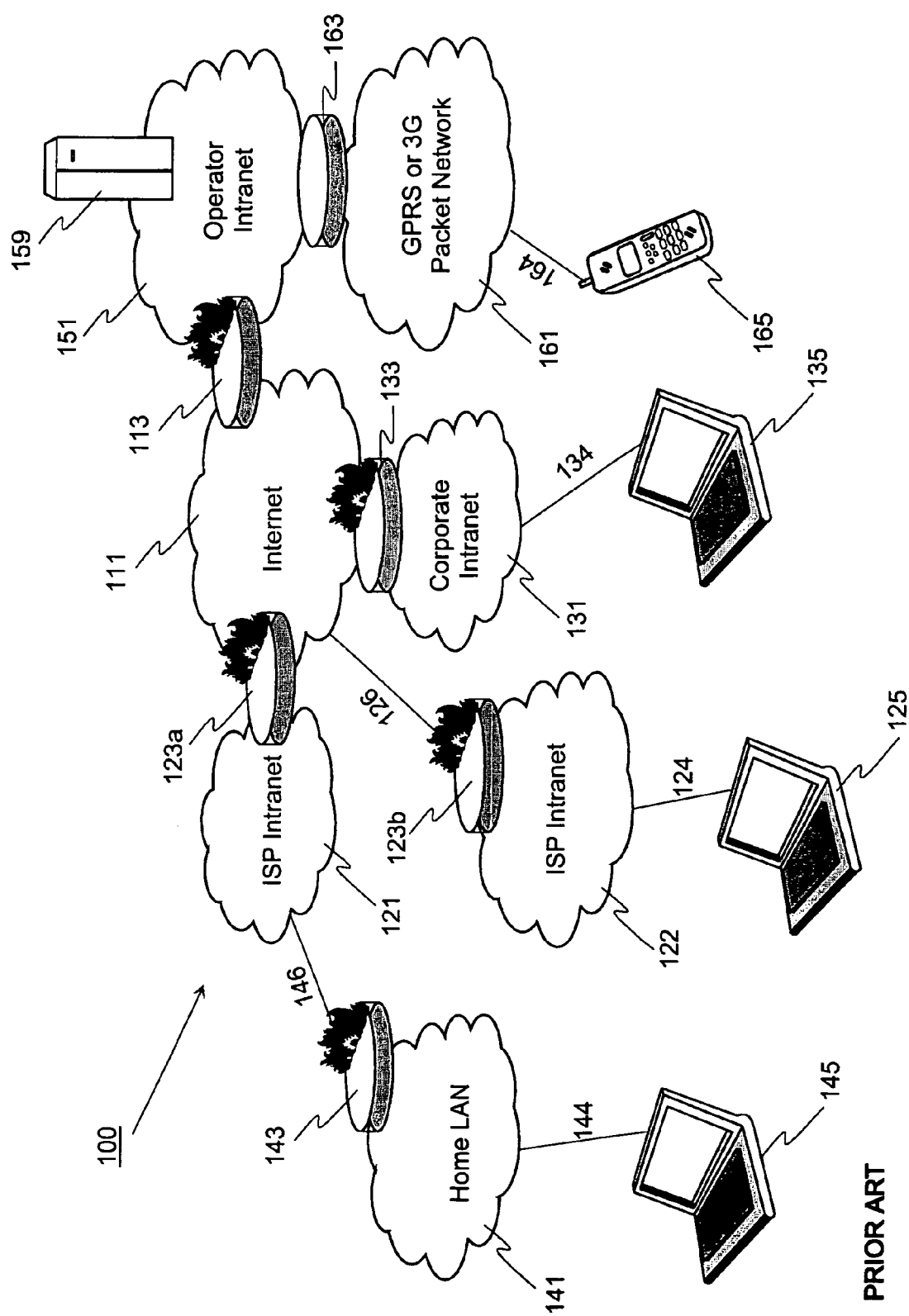
FIG. 1 shows a schematical representation of a telecommunication network of a prior art.

FIG. 1 was discussed in conjunction with the description of the prior art.

Figure 2:
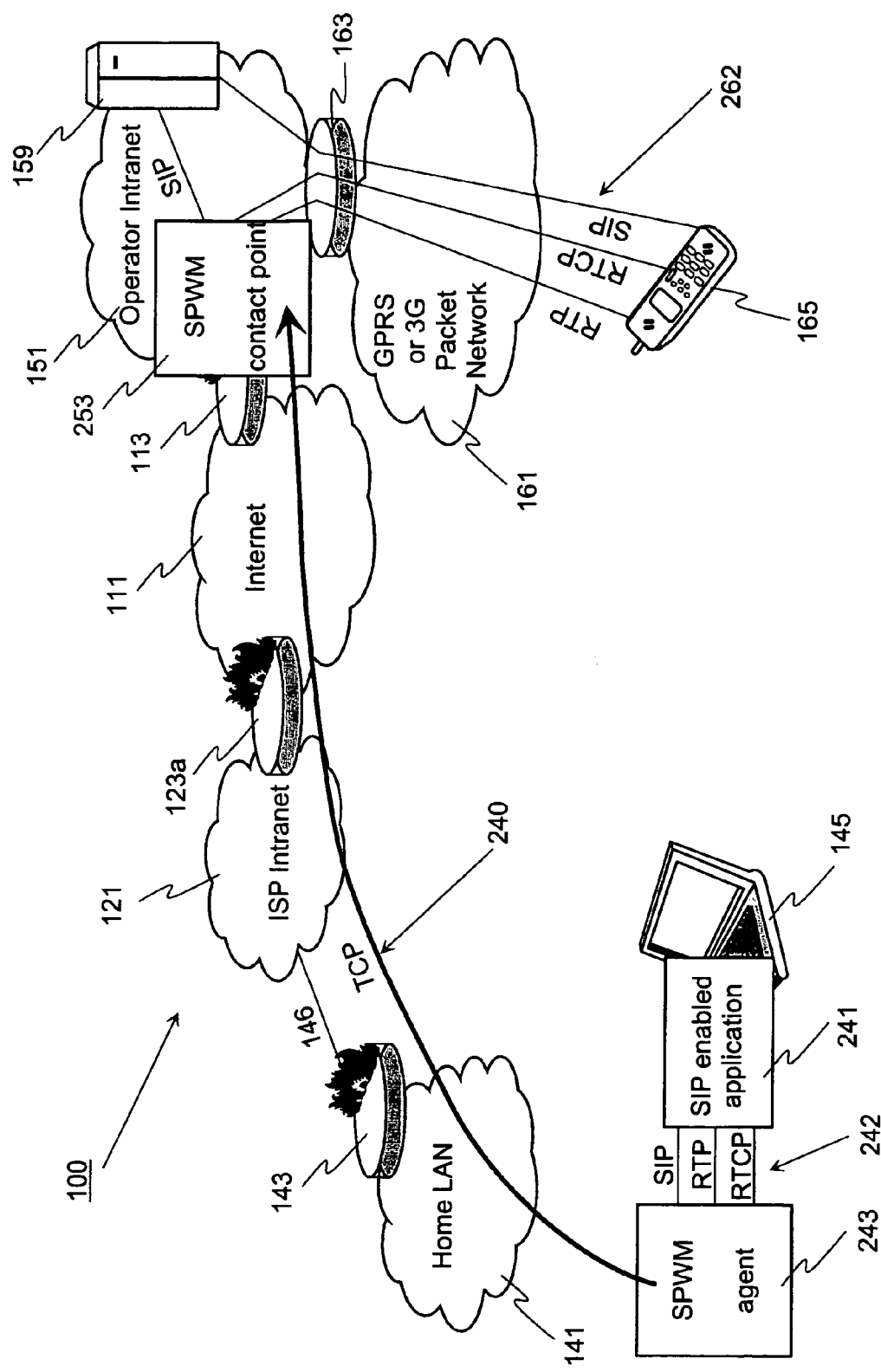
FIG. 2 shows an embodiment of the invention where a TCP tunnel according to the invention from a workstation to a mobile terminal is established.

FIG. 2 illustrates an example of the present invention (SPWM). A SIP application 241 is installed in a work station 145. The work station 145 can be e.g. a PC, a Laptop or a PDA (Personal Digital Assistant), which can be connected via WLAN to an ISP network. In a first advantageous embodiment of the invention a user level software application according to the invention is assembled in the workstation 145. This software application builds up a SPWM agent 243. In a second advantageous embodiment the SPWM agent 243 is embedded in the SIP application 241 itself. In a third advantageous embodiment of the invention there is in the sub-network 141, as a Home LAN, Corporate Intranet or ISP Intranet, a computer or a server, which includes the SPWM agent 243 of the present invention. In all embodiments the SPWM agent 243 utilizes the existing IP address of the host running it instead of providing additional virtual network interface with different IP address as the prior art tunnelling methods e.g. VPN do. The one and the same SPWM agent 243 can advantageously serve multiple SIP applications located in different devices inside one sub-network. In the example of FIG. 2 the SPWM agent can advantageously be embedded in a router or firewall 143, which discriminates the Home LAN 141 from the ISP Intranet 121.

In FIG. 2 the first embodiment of the invention is depicted. A SIP application 241 is saved in an exemplary Laptop 145. The Laptop 145 also includes a user level software application 243 according to the invention, i.e. a SPWM agent. These two applications can change messages at least by three protocols 242. The first protocol is SIP, which is used to launch a connection 240, 262 to another terminal 165 or application in a telecommunication network 100. The second and third protocol RTP (Real Time Protocol) and RTCP (Real Time Control Protocol) are needed if the application launched by SIP is working in real time mode. These two protocols are only examples of possible UDP protocols. These protocols are used as examples because they are commonly used in VoIP (Voice over IP) telephone applications. One example of VoIP applications is PoC (Push over Cellular) application, which can be utilized with the present invention. In other SIP applications any UDP or TCP data can be used as media in the same way.

Another device 165 whereto the connection 240, 262 from Laptop 145 is established in the example of FIG. 2 is a cellular network terminal. It resides in a cell of a cellular network 161 which utilizes packet switching, for example GPRS. The terminal 165 can also utilize SIP, RTP and RTCP protocols inside the GPRS network 161 and operator Intranet 151 connected to it. By SIP protocol the terminal 165 can launch a connection attempt inside the GPRS network 161 and/or operator Intranet 151 where a SIP server 159 administers all data communication links inside the operator Intranet 151. RTP and RTCP protocols are utilized in real time streaming (i.e. typically voice or video) applications between the cellular terminal 165 and some other terminal or application inside the GPRS 161 or operator Intranet 151.

The present invention expands the possibility to use SIP, RTP and RTCP also with terminals or applications outside the operator Intranet 151. This is achieved by a Split Proxy With Media server side part 253 according to the invention (i.e. SPWM contact point). Advantageously the SPWM contact point 253 resides in a router or firewall element 113, which discriminates the Internet 111 from the service operator's own Intranet 151. The SPWM contact point 253 can be implemented by a software application, which is embedded in said router 113. In an alternative embodiment of the invention the SPWM contact point 253 is installed in a computer or server inside the operator Intranet 151 (not shown in FIG. 2). In both embodiments the SPWM contact point 253 according to the invention in the operator Intranet 151 has a permanent IP address, which is known by the SPWM agents 243 or the SPWM contact point 253 can have dynamic IP address that can be resolved from known and permanent hostname at the agent using DNS (Domain Name Server).

With the present invention it is possible to get SIP applications working from a home LAN, Intranet or the Internet through any NAT or firewall elements in a transparent way. There is no need to modify the home LAN or Intranet NAT, router or firewall configuration; only the TCP listening port of SPWM contact point 253 needs an access from the Internet like e.g. an email server. There is no need either to modify the SIP server 159, IMS service platform or application servers in the operator Intranet 151. The present invention also increases capacity of a NAT compared to the prior-art solutions, because the SPWM agent or SPWM contact point packs SIP and multiple medias on the same connection seen by the NAT.

The SPWM configuration according to the invention also provides an easy way to arrange secure tunnel 240 between the SPWM agent 243 and SPWM contact point 253. User specific ciphering can be applied to the data on the tunnel between these elements. A pseudo random ciphering key can be inherited from authorization headers of the SIP registration dialog negotiated by the client application 241 and the SIP proxy 159. This avoids the need to configure the VPN tunnel security keys separately. In addition, also other known security mechanisms can be used. SPWM configuration also provides additional security to the home or corporate network when compared to the prior-art solutions, because no open listening sockets are needed.

A TCP tunnel 240 according to the invention is always established from the SPWM agent 243 to the SPWM contact point 253. The TCP tunnel is established from the SPWM agent 243 to an IP address of the SPWM contact point 253.

Figure 3:
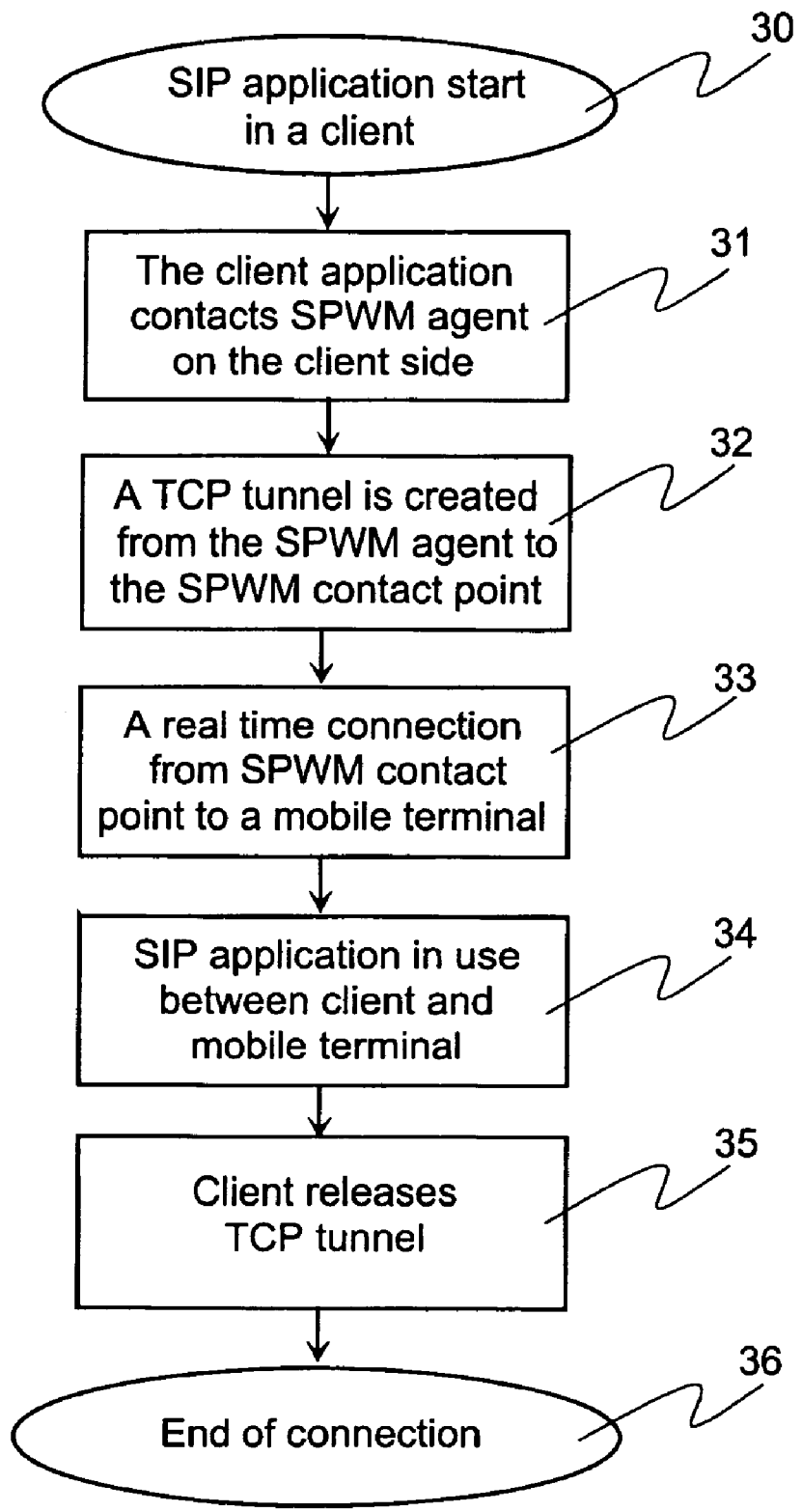
FIG. 3 shows as an exemplary a flow chart including main stages of the method according to the invention.

FIG. 3 illustrates in the form of an exemplary flow chart the main stages of the connection establishment and data transmission when using the method of the present invention. Also references in FIG. 2 are used in aid of the description of FIG. 3.

In phase 30 a SIP application 241 is launched in a work station 145. Next, in phase 31, the SIP application 241 establishes a connection 242 utilizing SIP, RTP and RTCP protocols to a SPWM agent 243. The SPWM agent 243 can be embedded in the SIP application as a functional part, be a separate software application installed in the workstation 145 or software application installed in a computer or server in a local network whereto the workstation 145 can establish a transmission connection.

In phase 32 the SPWM agent 243 establishes a tunnel 240 to a SPWM connection point 253 utilizing permanent IP addresses or DNS names of these functional units. The protocol used in the tunnel 240 can be for example TCP, which transfers SIP, RTP and RCTP information to the connection point 253.

The SPWM connection point 253 resides advantageously in cellular network operator Intranet 151 for example in a router 113. Inside the Intranet 151 and a GPRS network connected to it, SIP and RTP, RCTP or any other application specific UDP protocol carrying the application media, can again be used freely. By utilizing received SIP information a SIP server 159 connects the SPWM connection point 253 to a mobile terminal 165 residing in the GPRS network 161, phase 33. Data transfer between the mobile terminal 165 and the SPWM connection point 253 utilizes RTP and RTCP protocols, phase 34.

When the SIP enabled application does not anymore need a data transmission link to the mobile terminal 165, the SPWM agent 243 releases the tunnel 240 in phase 35. After that the SIP application 241 advantageously shuts off in the work station 145 in phase 36.

Above-described steps can be accomplished by two software applications. The first application according to the invention can be installed for example in the SIP application 241 it self, in a work station 145, in a server in the serving sub-network 141 or in a router or firewall 143 of the sub-network 141.

The second application according to the invention is advantageously installed in router or firewall 131 of the operator Intranet 151 or in a server inside the operator Intranet 151 or it can be embedded in the SIP server farm 159.

Some advantageous embodiments according to the invention were described above. The invention is not limited to the embodiments described. The inventional idea can be applied in numerous ways within the scope defined by the claims attached hereto.

What is claimed is:

1. A method for establishing a data transfer connection from a first device utilizing SIP protocol to a second device over a telecommunication network with at least two sub-networks from which at least one is unable to utilize SIP protocol, the method further comprising
   establishing a tunnel utilizing TCP protocol from a client application residing in a first sub-network, whereto the first device has established a connection utilizing SIP protocol; and
   wherein said tunnel established over sub-networks not supporting SIP protocol is terminated to a server application in a second sub-network supporting SIP protocol, which server application has a permanent IP address or DNS name, whereto is connected said second device, which utilizes SIP protocol.

2. The method according to claim 1 wherein said tunnel is created by a SPWM agent residing in the first sub-network to a SPWM contact point residing in the second sub-network.

3. The method according to claim 2 wherein said SPWM agent receives and transmits messages utilizing SIP, UDP or TCP protocols from or to a SIP application residing in said first terminal.

4. The method according to claim 3 where said SIP-application is a VoIP application.

5. The method according to claim 4 wherein said SIP-application is a PoC application.

6. The method according to claim 2 wherein said SPWM contact point receives messages utilizing TCP protocol from said agent via said tunnel and utilizes SIP, UDP or TCP protocols in communication with the second terminal.

7. The method according to claims 3 wherein said UDP protocol comprises RTP and RTCP protocols.

8. A network arrangement for establishing a data transfer connection from a first device utilizing SIP application to a second device over a telecommunication network with at least two sub-networks from which at least one is unable to utilize SIP protocol, the network arrangement comprising;
   a tunnel established utilizing TCP protocol from a client application residing in a first sub-network serving the first device; and
   wherein said tunnel over sub-networks not supporting SIP protocol is terminated to a server application in a second SIP supporting sub-network, which server application has a permanent IP address or DNS hostname, whereto is connected said second terminal, which utilizes SIP protocol.

9. The network arrangement according to claim 8 wherein said tunnel is created by a SPWM agent residing in the first sub-network to a SPWM contact point residing in the second sub-network.

10. The network arrangement according to claim 9 wherein said SPWM agent is a software application embedded in a router of the first sub-network.

11. The network arrangement according to claim 9 wherein said SPWM agent is a software application embedded in a server residing in the first sub-network.

12. The network arrangement according to claim 9 wherein said SPWM agent is a software application saved in the first device.

13. The network arrangement according to claim 9 wherein said SPWM agent is embedded in said SIP application of the first device.

14. The network arrangement according to claim 13 where said SIP-application is a VoIP application.

15. The network arrangement according to claim 14 wherein said SIP application is a PoC application.

16. The network arrangement according to claim 9 wherein said SPWM agent is arranged to receive and transmit messages utilizing SIP, UDP and TCP protocols from or to the SIP application residing in the first device.

17. The network arrangement according to claim 16 wherein said UDP protocol comprises RTP and RTCP protocols.

18. The network arrangement according to claim 9 wherein said SPWM contact point is a software application embedded in a router of the second sub-network.

19. The network arrangement according to claim 9 wherein said SPWM contact point is a software application embedded in a server residing in the second sub-network.

20. The network arrangement according to claim 9 wherein said SPWM contact point is arranged to receive messages utilizing TCP protocol from said SPWM agent via said tunnel and to utilize SIP, UDP or TCP protocols in communication with the second device.

21. The network arrangement according to claim 20 wherein said UDP protocol comprises RTP and RTCP protocols.

22. The network arrangement according to claim 9 wherein the first sub-network is one of the following: a Home LAN, an ISP Intranet, a corporate Intranet, the Internet and the second sub-network is a combination of an operator Intranet and a packet switched cellular network.

23. A computer program product comprising:

A computer usable medium having computer readable code means embodied therein for causing a computer to create a SPWM agent in a user device, the computer readable code means in the computer program product further comprising:

computer readable code means for causing the SPWM agent to send and receive messages utilizing SIP, UDP or TCP protocols to and from a SIP application residing in the user device computer readable code means for causing the SPWM agent to create a TCP connection from the SPWM agent to a SPWM connection point computer readable code means for causing the SPWM agent to use user specific ciphering in data transmission with the SPWM connection point.

24. The computer program product according to claim 23 wherein said UDP protocol comprises RTP and RTCP protocols.

25. A computer program product comprising:

a computer usable medium having computer readable code means embodied therein for causing a computer to create a SPWM contact point in the computer residing in a operator Intranet, the computer readable code means in the computer program product further comprising:

computer readable code means for causing the SPWM contact point to receive messages utilizing TCP protocol from a SPWM agent computer readable code means for causing the SPWM contact point to use user specific ciphering in data transmission with the SPWM agent computer readable code means for causing the SPWM contact point to use SIP protocol in communication with a SIP server residing in the operator Intranet computer readable code means for causing the SPWM contact point to utilize UDP or TCP protocols with a cellular terminal residing in an operator's cellular network.

26. The computer program product according to claim 25 wherein said UDP protocol comprises RTP and RTCP protocols.

* * * * *